United States Patent [19]

Jones, Jr.

[11] Patent Number: 5,010,342
[45] Date of Patent: Apr. 23, 1991

[54] RADAR SIMULATOR

[76] Inventor: James R. Jones, Jr., 2944 Renault Pl., San Diego, Calif. 92122

[21] Appl. No.: 365,303

[22] Filed: May 14, 1973

[51] Int. Cl.$^5$ .......................... G01S 7/40; G09B 9/00
[52] U.S. Cl. ........................................ 342/169; 434/2
[58] Field of Search ............. 35/10.4; 343/18 E, 17.7, 343/6 A, 5 PC; 325/6; 342/169; 434/2

[56] References Cited

U.S. PATENT DOCUMENTS

| | | | |
|---|---|---|---|
| 3,600,685 | 8/1971 | Doyle | 343/18 E |
| 3,634,858 | 1/1972 | Mitchell | 35/10.4 |
| 3,634,887 | 1/1972 | Buchholz | 35/10.4 |
| 3,710,256 | 1/1973 | Lewis | 325/6 |
| 3,720,944 | 3/1973 | Kramer et al. | 343/18 E |

Primary Examiner—Gregory C. Issing
Attorney, Agent, or Firm—Harvey Fendelman; Thomas Glenn Keough; T. M. Phillips

[57] ABSTRACT

Radar signature simulator for use in electronic warfare and training intercept operators. Recorded video portions of radar signature as they appear at the point of intercept on a video tape recorder are played back to produce video signals. These signals are used to amplitude modululate an RF signal of the desired frequency. The modulated signal is amplified in a linear amplifier and fed to a broadband tansmitting antenna.

7 Claims, 2 Drawing Sheets

RADAR SIMULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In order to provide immediate warning of impending attacks in spite of an ever increasing reliance on automatic and semi-automatic active systems aboard ships, it is still the responsibility of the countermeasures operator to be able to recognize and evaluate intercepted eletromagnetic signals. Since the ability of an operator to recognize and detect electromagnetic signals trasmitted by a foreign source is dependent on his knowledge and experience in recognizing the signals, training with live signals is essential. In the past operators have listened to tape recordings of foreign tramsissions and in some instances, when available, have been able to detect live transmissions. However, in most instances live transmissions are non-existent especially for training facilities within the confines of the United States. In most instances live transmissions are only for a few seconds duration, therefore, the operator cannot afford the luxury of searching through publications to identify or verify intercepted signals. A need then exists for a means of training intercept operators to become proficient in recognizing immediately intercepted electromagnetic signals regardless of their origin and a need also exists for a means of providing live radar signatures for testing automatic radar signature recognition equipment and for the training of operators in using this equipment.

SUMMARY OF THE INVENTION

The present invention provides a means of transmitting live transmissions for training intercept operators as if in an actual combat situation. A video tape recording of the video portion of synthetic or live radar transmissions is played on a video tape recorder to generate video signals. The output video signal from the video tape recorder is used to modulate the output of a radio frequency generator tuned to the same frequency as the carrier frequency of the signal to be simulated. The reconstituted reproduction of the signals originally received from the device to be simulated are amplified to obtain sufficient power for transmission. An intercept operator sitting at a position may then tune his receiver across a band of frequencies to test his ability to select and identify the radar transmissions. Also automatic recognition equipment could be tested by providing it with a known radar signature.

Accordingly, an object of the invention is the provision of a simulated radar transmission that avoids the disadvantages of building individual circuits to generate the waveform patterns for each simulated signal.

Another object of the invention is the provision of a system for training intercept operators identifying foreign transmissions that has an infinitely larger number of parameters that may be generated in comparison with any other system of this type for training purposes.

Another object of the invention is the provision of a means of training intercept operators that is highly flexible and easily made portable for tactical situations.

Another object of the invention is the provisions of an operator training device which may also be used as a tactical form of imitation and deception as a function of electronic warfare.

Other objects and many of the attendant advantages of this invention will become readily appreciated as the same becomes better understood by reference to the following detailed description when considered in connection with the accompanying drawings wherein.

DESCRIIPTION OF THE PREFERRED EMBODIMENTS

Figure 1:
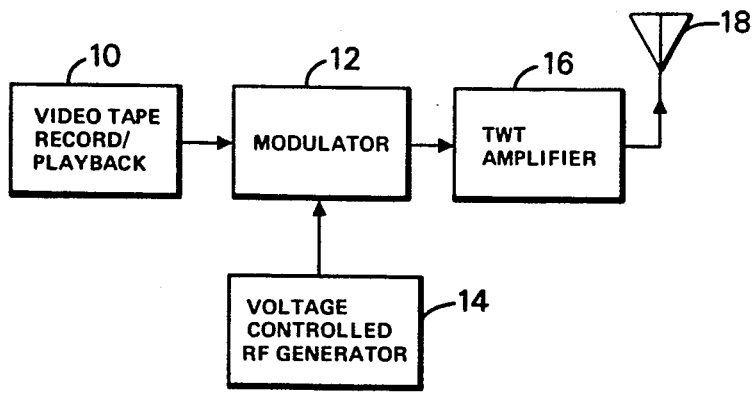
FIG. 1 is a simplified block diagram of a radar simulator embodying the invention.

Radar signals being transmitted by a radar set are unique to that particular radar because of its electrical and mechanical characteristics. Because each radar set transmits unique radar patterns, intercept operators are able to identify a signal as being transmitted by a particular radar set. Identification is also made by automatic recognition equipment by comparing the received signals with signals stored in its data bank. Each radar set then has an identifying signature. Each signature can be divided into two elements, video and the radio frequency of the carrier. The video is the detected envelope of the pulses as they appear when illuminating a target.

Video recordings can be made of these detected video envelopes. The present invention contemplates the use of such recorded video signals for modulating an RF signal. As shown in the block diagram of FIG. 1, a recording of the video portion of a radar signature is played back on a video tape recorder 10. The output signal from video tape recorder 10 is fed to modulator 12 for modulating the signal from RF frequency generator 14. The frequency of RF generator 14 should be set to the same frequency as the receiver receiving the recorded video signal was tuned when it was recorded. The modulated signal is then fed to a traveling wave tube amplifier 16 where the signal is amplified sufficiently to be radiated by means of transmitter 18. Traveling wave tube amplifier 16 is a linear amplifier and will transmit all of the modulated signal, maintaining the side lobes so that one intercepting the signal would see it as a signal transmitted from an actual radar transmitter.

It is to be understood that the utility of the invention is the function of the information recorded on the tapes. For jamming of automatic recognition systems, many different bogus radar signatures would be recorded and then transmitted. All new signals received by the automatic recognition equipment would be stored and soon saturate its memory with useless information.

Figure 2:
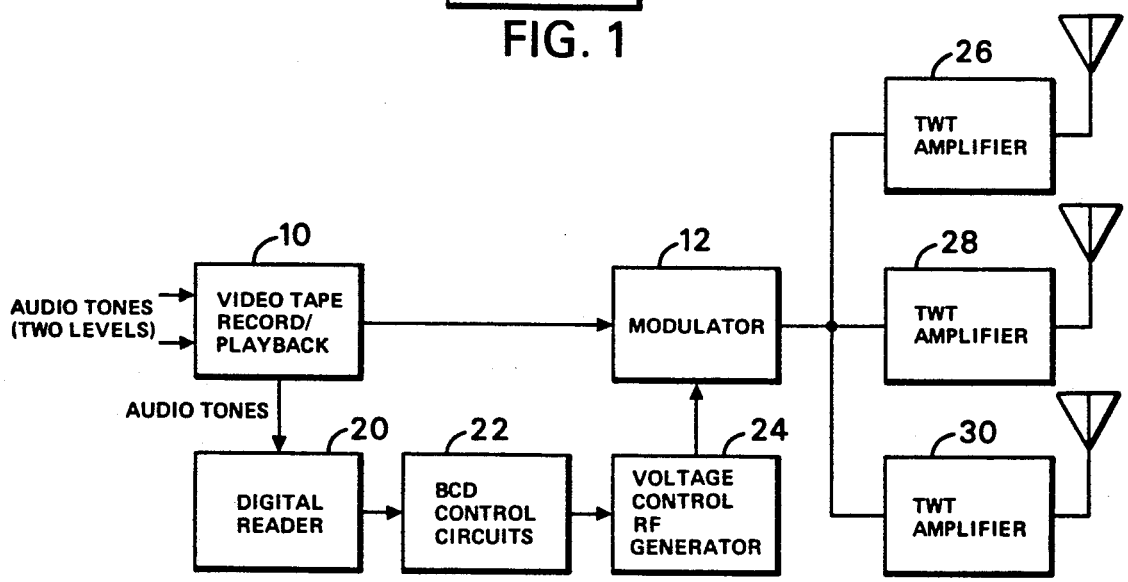
FIG. 2 is a modification of the embodiment of FIG. 1 to increase the frequency range of the power output.

The modification shown in FIG. 2 shows a means for increasing the frequency range of the radar simulator of FIG. 1. Audio tones having a constant frequency are recorded on two tracks of the recording tape. On playback, the pre-recorded audio tones are fed to a frequency counter or digital reader. The output of reader 20 is a binary coded digital signal which is fed to control circuits 22 which provides an analog voltage proportional to the frequency of the audio tone. The output frequency of RF generator 24 is controlled by the voltage from BCD control circuits 22. Since TWT amplifiers are designed for a band of frequencies a plurality of TWT amplifiers 26, 28, and 30 are coupled to the output of modulator 12. Only one amplifier will respond to that RF energy which is within its bandwidth.

Figure 3:
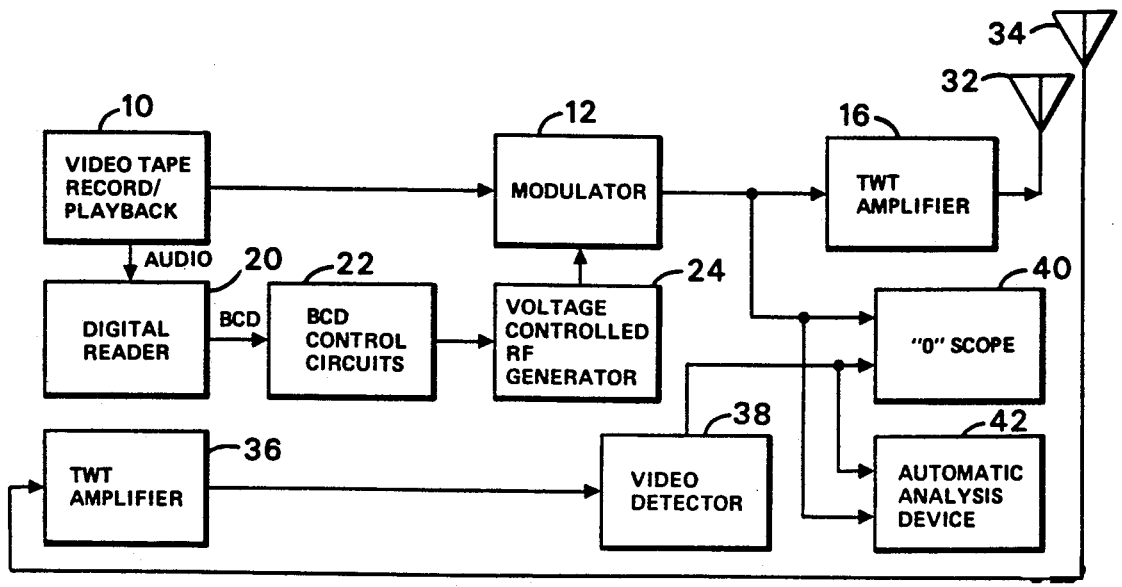
FIG. 3 is a block diagram of a electronic countermeasures testing system embodying the invention.

When used as an electronic ountermeasures detector (FIG. 3), video tape recorder 10 would supply a number of different radar signatures in sequence to modulator 12. Simultaneously digital frequency control signals are fed from another track by means of audio tones to digital reader 20 and control circuits 22 to variable RF frequency generator 24. The high RF power output from linear amplifier 16 is fed to transmitting antenna 32 for radiation. The radiated power can be expected to cause a radar echo to be returned and if the target from which the echo signal would return is equipped with a radar transponder, it may be expected to cause the transponder to activate and return a false pulse. Receiving antenna, 34, tuned to the same bandwidth as antenna 32 receives the returning false signal. The returning RF energy is fed from antenna 34 to TWT amplifier 36 tuned to the same bandwidth as amplifier 16. The pulse amplitude variations are then detected in video detector 38 and fed to "0" scope 40 and automatic analysis device 42. The output from modulator 12 is also fed to "0" scope 40 and analysis device 42 so that a comparison can be made to determine if false signals are present and their parameters are as expected.

Figure 4:
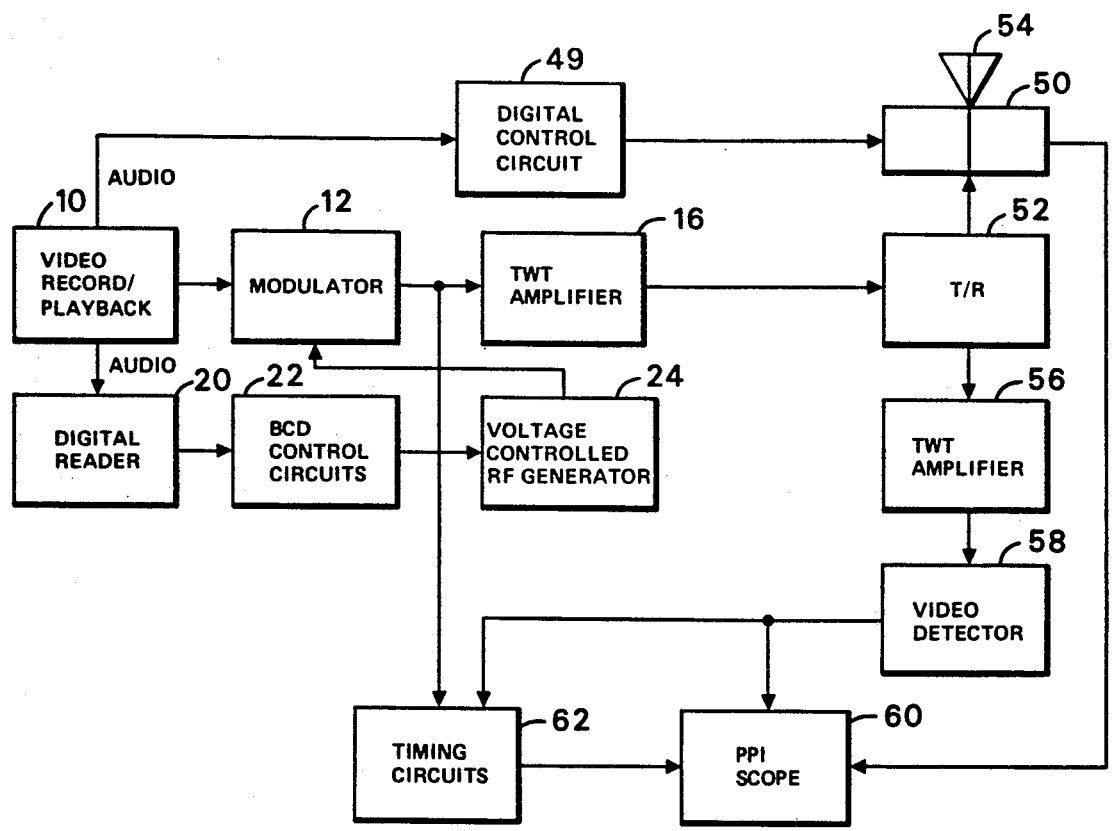
FIG. 4 is a block diagram of a radar with variable frequency, pulse width, pulse repetition frequency and scan rate embodying the invention.

As a deceptive device in electronic warfare, the radar of FIG. 4 is used for transmitting bogus radar signatures or known radar signatures at a location remote from the actual radar. Video recorder 10 continuously supplies radar signature signals while simultaneously supplying digital control signals through control circuit 49 to the antenna scan control 50 and the RF source 24. The radar signature video parameters are again used to modulate the RF source and the resultant pulse amplitude variations are amplified and fed through T/R switch 52 to antenna 54. The received radar echo is fed through T/R switch 52 to amplifier 56. The video is detected in video detector 28 and presented in a normal radar display unit 60. Synchronization is maintained based on the pulse transmission rate through training circuits 62.

Figure 5:
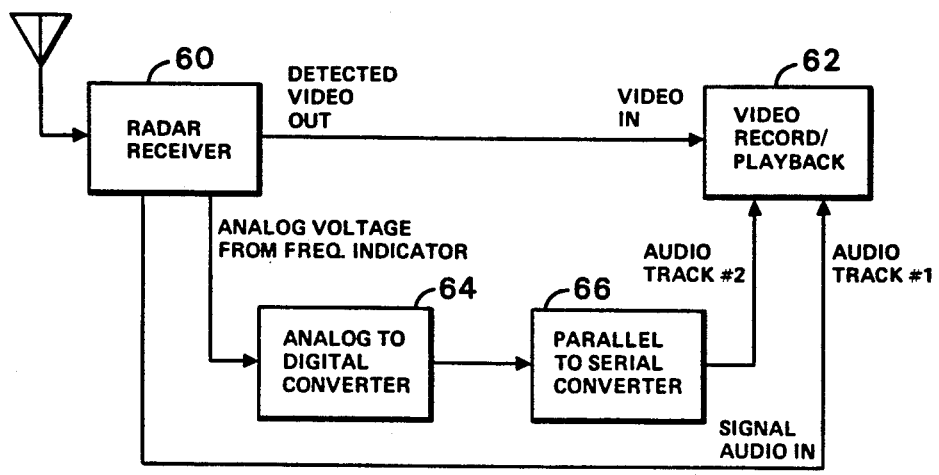
FIG. 5 is a block diagram of a radar signature recording means with automatic frequency anotation.

FIG. 5 shows a means of radar signature recording with automatic frequency anotation. Radar receiver 60 provides detected video signals which are recorded directly on the video track of recorder 62. The audio sounds made by the video parameters are recorded on audio track No. 1 of recorder 62. The frequency at which the intercept was made is recorded on audio track No. 2 by connecting the analog voltage from the frequency indicator of receiver 60 to digital form in analog to digital converter 64 and then to serial pulses in parallel to serial converter 66.

Obviously many modifications and variations of the present invention are possible in the light of the above teachings. It is therefore to be understood that within the scope of the appended claims the invention may be practiced otherwise than as specifically described.

What is claimed is:
1. A radar signature simulator comprising:
    (a) means for generating the video portion of a radar signature,
    (b) RF signal generating means for generating an RF signal of a predetermined frequency,
    (c) amplitude modulator circuit means coupled to said video generating means and to said RF signal generating means for providing an amplitude modulated RF output signal,
    (d) linear amplifier means coupled to said modulator circuit means for linearly amplifying said modulated signal,
    (e) broad-band antenna means coupled to said linear amplifier means for transmitting said amplified dmodulated signal.
2. The radar simulator of claim 1 wherein said linear smplifier means is a traveling wave tube amplifier.
3. The radar simulator of claim 1 wherein said linear amplifier means is a pluralilty of traveling wave tube amplifiers.
4. The radar simulator of claim 1 wherein said means for generating the video portion of a radar signature is a video tape recording of a radar signature.
5. The radar signature simulator of claim 4 wherein digital control circuit means is coupled between said means for generating the video portion of a radar signature and the RF signal generating means for controlling the frequency of said RF signal generator in response to information contained in said tape recording.
6. The radar signature simulator of claim 1 wherein said means for generating the video portion of a radar signature is a video tape recording of specific radar signatures of known radar transmitters.
7. An electronics countermeasures testing system for testing the presence of a radar transponder comprising:
    (a) means for generating the video portion of a radar signature,
    (b) a variable RF signal generating means for generating an RF signal,
    (c) amplitude modulator circuit means coupled to said video generating means and to said RF signal means for providing an ampliltude modulated RF output signal,
    (d) linear amplifier means coupled to said modulator circuit means for linearly amplifying said modulated signal,
    (e) broad band antenna means coupled to said linear amplifier means for transmitting said amplified modulated signal,
    (f) radar signal receiving means for receiving reflections of said transmitted signal and re-transmission of said transmitted signal from a transponder,
    (g) circuit comparison means having a first input coupled to said radar signal receiving means and a second input coupled to the output of said modulator circuit means for comparing the signature of the transmitted signal with the signature of the received signal to determine if bogus signals are present.

* * * * *